United States Patent

Watanabe et al.

[11] Patent Number: 5,989,391
[45] Date of Patent: Nov. 23, 1999

[54] REACTION PRODUCT OF SULFONATED AMINO RESIN AND AMINO GROUP-CONTAINING SUBSTANCE AND PAPERMAKING PROCESS

[75] Inventors: Yoshitane Watanabe; Kiyomi Ema, both of Funabashi; Takaichi Sugiyama, Fuchu-machi; Hisanobu Urahata, Tokyo; Michie Kaneko, Funabashi, all of Japan

[73] Assignee: Nissan Chemical Industries, Ltd., Tokyo, Japan

[21] Appl. No.: 08/945,270

[22] PCT Filed: Apr. 17, 1996

[86] PCT No.: PCT/JP96/01043

§ 371 Date: Oct. 27, 1997

§ 102(e) Date: Oct. 27, 1997

[87] PCT Pub. No.: WO96/34027

PCT Pub. Date: Oct. 31, 1996

[30] Foreign Application Priority Data

Apr. 27, 1995 [JP] Japan .................. 7-129431
May 23, 1995 [JP] Japan .................. 7-123553

[51] Int. Cl.⁶ .................. C08G 12/40; D21H 17/51

[52] U.S. Cl. .................. 162/164.5; 162/164.1; 162/164.6; 162/166; 162/175; 162/165; 162/178; 524/247; 524/249; 528/157; 528/158

[58] Field of Search ............... 162/164.5, 166, 162/167, 175, 164.1, 164.6, 177, 178, 165; 528/156, 157, 158, 162; 524/247, 249

[56] References Cited

U.S. PATENT DOCUMENTS

| 2,564,925 | 8/1951 | Pollard ............... 524/213 |
| 2,949,396 | 8/1960 | Bonzagni ............. 162/167 |
| 2,986,489 | 5/1961 | Maxwell .............. 162/166 |
| 3,340,237 | 9/1967 | Sellet ................ 528/363 |
| 4,430,469 | 2/1984 | Bürge et al. ......... 524/247 |
| 5,286,347 | 2/1994 | Richardson .......... 162/199 |

FOREIGN PATENT DOCUMENTS

| 0 690 083 | 1/1996 | European Pat. Off. |
| 32 24 107 | 1/1993 | Germany . |

*Primary Examiner*—Jose Fortuna
*Attorney, Agent, or Firm*—Oblon, Spivak, McClelland, Maier & Neustadt, P.C.

[57] ABSTRACT

A product obtained by reacting a sulfonated amino resin and an amino group-containing substance in a weight ratio of from 1:0.05 to 1:3.

11 Claims, 1 Drawing Sheet ns et al.

REACTION PRODUCT OF SULFONATED AMINO RESIN AND AMINO GROUP-CONTAINING SUBSTANCE AND PAPERMAKING PROCESS

TECHNICAL FIELD

The present invention relates to a product obtained by reacting a sulfonated amino resin and an amino group-containing substance, a sol of the product and a process for producing it. The present invention also relates to a papermaking process which comprises sheeting an aqueous papermaking stock containing cellulose fibers or cellulose fiber and an inorganic filler material, followed by removal of water and drying, characterized by use of a product obtained by reacting a sulfonated amino resin and an amino group-containing substance, whereby the retention of cellulose fibers and an inorganic filler material during sheeting is sufficiently improved, and drainage is improved without lowering the strength or the quality of a paper sheet, to improve the production efficiency during sheeting and during drying.

BACKGROUND ART

A zeta potential regulator for papermaking which contains a sulfonic acid group-containing melamine-formaldehyde condensate as an active ingredient is proposed in Japanese Unexamined Patent Publication No. 259699/1985. The publication discloses that the sulfonic acid group-containing melamine-formaldehyde condensate is obtained by condensing 1 part by mol of melamine or a mixture of melamine and another condensable compound, 2 to 4 parts by mol of formaldehyde or an equivalent mols of a formaldehyde donor, and from 0.5 to 2 parts by mol of a bisulfite and a sulfite or an equivalent mols of a bisulfite or sulfite donor in a molar ratio of formaldehyde to the bisulfite or the sulfite of from 4.5:1 to 2:1.

Many sulfonated amino resins have been proposed as water reducing agents for concrete. Japanese Examined Patent Publication No. 13991/1977 proposes an aqueous solution of a sulfonic acid group-containing melamine-formaldehyde condensate obtained by reacting a melamine-urea mixture, formaldehyde and an alkali sulfite in an aqueous solution in a molar ratio of 1:2.7 to 3.2:0.9 to 1.1. Japanese Examined Patent Publication No. 43699/1989 proposes a sulfonic acid group-containing melamine-formaldehyde condensate obtained by condensing melamine, formaldehyde and a sulfite in an aqueous medium in a molar ratio of 1:2.2 to 3.2:0.3 to 1.0.

The above-mentioned sulfonic acid group-containing melamine-formaldehyde condensates are not so effective as a retention aid during sheeting, and have a drawback that it is inferior in slump retention, though they are very effective as a water reducing agent for concrete. The sulfonic acid group-containing melamine-formaldehyde condensates has another drawback that their application and amount are limited because of the remaining free formaldehyde. In addition, it is difficult to obtain a sulfonic acid group-containing melamine-formaldehyde condensate having a high viscosity by the methods disclosed in the above publications.

No report has been made about a product obtained by reacting a sulfonated amino resin and an amino group-containing substance.

The first aspect of the present invention provides a product obtained by reacting a sulfonated amino resin and an amino group-containing substance which solves the above-mentioned drawbacks of prior art and is a novel material useful in many ways, and a process for its production.

The present inventors have found that an amino group-containing substance such as melamine can be easily dissolved in an aqueous solution of a sulfonated amino resin, and accomplished the first aspect of the present invention as a result of extensive researches. Namely, the first aspect of the present invention provides a product obtained by reacting a sulfonated amino resin and an amino group-containing substance which is useful in a wide variety of industries, e.g., as a retention aid in production of paper made mainly of cellulose fibers, or cellulose fibers and inorganic filler materials, as a flocculant in waste water treatment, as a water reducing agent in preparation of hydraulic inorganic materials such as cement and gypsum, as an admixture for the earth pressure shield tunneling method, and as a dispersant for coating, its sol and a process for its production.

Paper made mainly of cellulose fibers or of cellulose fibers and inorganic filler materials is generally manufactured by supplying an aqueous papermaking stock prepared by dispersing and separating a cellulose pulp in water, adjusting the concentration and, if desired, adding filler materials and other additives, to a papermaking machine, followed by removal of water and drying processes. To improve retention of cellulose fibers and fillers, strength and quality of a paper sheet and productivity, papermaking machines, various additives such as cationic starch and papermaking processes have been improved.

It has been conventional to employ the acid papermaking process wherein aluminum sulfate is used as a flocculant and as a fixer for sizing agents, and an anionic organic polymer is used as a strength agent and as a retention aid. In recent years, inorganic filler materials are added in increasing amounts for the purposes of cost-cutting and improved quality of a paper sheet, and more low-quality pulp is used due to shortage of high quality pulp and for the purpose of cost-cutting. Further, the sheeting rate is increasing for improved productivity. The acid papermaking process, which requires much aluminum sulfate, is displaced by a modified acid papermaking process and by the neutral papermaking process in many cases because of inadequate durability of the resulting paper, insufficient reuse of white water, corrosion of facilities and unusability of calcium carbonate as an inorganic filler material. Techniques and additives developed for the conventional acid papermaking process are not sufficiently effective in the alternative processes. Therefore, retention aid and methods for improving retention are especially desired to be developed, and many proposals for the acid papermaking process and the neutral papermaking methods have been made.

It has been long known to use a cationic starch in order to cause flocculation, which is advantageous to papermaking and to improve strength of a paper sheet. Japanese Examined Patent Publication No. 6587/1980 proposes a method employing a combination of a cationic component such as a cationic starch or an acrylamide copolymer with an anionic component such as natural starch or a carboxymethylated starch, and Japanese Unexamined Patent Publication No. 12824/1980 proposes a method using a cationic resin emulsion and an anionic water-soluble polymer in combination. Japanese Unexamined Patent Publication No. 259699/1985 discloses a method wherein a zeta potential regulator containing a sulfonic acid group-containing melamine-formaldehyde condensate as the active ingredient is added before sheeting an aqueous papermaking stock containing an amphoteric polyacrylamide as a strength agent. Japanese Unexamined Patent Publication No. 14096/1990 proposes a method wherein a cationic starch is used in combination with a converted cationic starch obtained by cooking cationic starch together with from 0.2 to 15 wt %, based on the cationic starch, of an anionic polymer. As the anionic polymer, a sulfonic acid group-containing melamine-formaldehyde condensate is proposed.

The methods proposed by Japanese Unexamined Patent Publications No. 6587/1980 and No. 12824/1980 characterized by combined use of a cationic organic polymer with an anionic organic polymer, improve retention of cellulose fibers and inorganic filler materials and strength of a paper sheet, but has a low productivity due to poor drainage, and lower quality of a paper sheet such as formation.

The combination of an amphoteric polyacrylamide with a zeta potential regulator containing a sulfonic acid group-containing melamine-formaldehyde condensate as the active ingredient, as proposed in Japanese Unexamined Patent Publication No. 259699/1985, can improve strength of a paper sheet. However, in this method, retention of cellulose fibers and inorganic filler materials is poor due to weak flocculation, and the drainage is also poor. The combination of a converted cationic starch with a sulfonic acid group-containing melamine-formaldehyde condensate as an anionic polymer, as proposed in Japanese Unexamined Patent Publication No. 14096/1990, achieves good retention and drainage but can not achieve sufficient retention under certain conditions due to insufficient flocculation and has a drawback that control of the performance of a converted cationic starch is difficult.

The second aspect of the present invention provides a papermaking process which can achieve sufficient retention and good drainage in sheeting under acidic and neutral conditions by the use of a product obtained by reacting a sulfonated amino resin and an amino group-containing substance.

DISCLOSURE OF INVENTION

The first aspect of the present invention provides a product obtained by reacting a sulfonated amino resin and an amino group-containing substance in a weight ratio of from 1:0.05 to 1:3.

The second aspect of the present invention provides a papermaking process which comprise sheeting an aqueous papermaking stock contains cellulose fibers (A), or cellulose fibers (A) and an inorganic filler material (B), followed by removal of water and drying, wherein a cationic or amphoteric polymer (C) and a product (D) obtained by reacting a sulfonated amino resin and an amino group-containing substance are added to the aqueous papermaking stock before the sheeting.

As the sulfonated amino resin to be used for the first aspect of the present invention, a sulfonate-containing melamine-formaldehyde condensate is preferably used. The sulfonate is a alkali metal salt, preferably the sodium salt. Commercial sulfonate-containing melamine-formaldehyde condensates available in aqueous solutions may be used as the sulfonate-containing melamine-formaldehyde condensate. Any aqueous sulfonate-containing melamine-formaldehyde condensate solutions obtained by known methods may be used. For example, Japanese Examined Patent Publication No. 43763/1990 discloses a method of preparing a highly concentrated aqueous sulfonate-containing melamine-formaldehyde condensate solution, which comprises reacting an amino group-containing substance composed mainly of melamine with from 0.9 to 1.1 mols of formaldehyde and from 0.3 to 0.4 mol of a sulfite per 1 mol of the amino groups in an aqueous medium at a pH of from 10 to 13 at a temperature of from 60 to 80° C. for from 20 to 60 minutes by heating, adding amidosulfonic acid and/or sulfuric acid to the reaction mixture to the pH of 4–6, heating the reaction mixture at a temperature of from 40 to 60° C. for from 50 to 300 minutes, immediately adjusting the pH to 11.5–13.5 and cooling it. The aqueous sulfonate-containing melamine-formaldehyde condensate solution obtained by this method may be used for the first aspect of the present invention. In this method, the amino group-containing substance composed mainly of melamine is melamine alone or a mixture of melamine with at most 20 wt %, based on the melamine, of an amino compound such as urea, a guanamine, dicyandiamide, an amine, an acid amide, phenol and resorcin. The formaldehyde is formalin, paraformaldehyde or the like. The sulfite may be sodium sulfite, ammonium sulfite, sodium bisulfite, ammonium bisulfite, sodium pyrosulfite or the like. The pH adjustment is effected with an alkaline substance such as caustic soda. The molecular weight of the sulfonated amino resin is preferably from 2,000 to 200,000, though it is not particularly restricted.

As the amino group-containing substance to be used for the first aspect of the present invention, melamine may be used solely, or a mixture of melamine with urea, a guanamine, dicyandiamide, an amine, an acid amide, phenol, resorcin and the like may be used. It is particularly preferred to use melamine ($C_3H_6N_6$) solely. Usual commercially available powdery melamine may be used.

The process for producing the product obtained by reacting a sulfonated amino resin and an amino group-containing substance according to the first aspect of the present invention comprises mixing an aqueous sulfonated amino resin solution and the amino group-containing substance in a solid content weight ratio of from 1:0.05 to 1:3, and heating the resulting mixture at a temperature of from 50 to 150° C. In this process, the amino group-containing substance may be mixed with an aqueous sulfonated amino resin solution before heating, or added to a pre-heated aqueous sulfonated amino resin solution. In order to prevent self-condensation of the sulfonated amino resin, it is preferred to mix the amino group-containing substance with an aqueous sulfonated amino resin solution before heating. Upon heating at the above-mentioned temperature, the methylol or sulfonic acid groups in the sulfonated amino resin and the amino groups in the amino group-containing substance undergo condensation by dehydration to give a condensation product. The condensation is promoted by addition of a catalyst, for example, a mineral acid such as sulfuric acid or hydrochloric acid, or an organic acid such as sulfamic acid, formic acid, or acetic acid. It is preferred to add a catalyst so that the pH of the aqueous solution containing the sulfonated amino resin and the amino group-containing substance is from 5 to 10. Since a sulfonated amino resin usually contains an alkali salt of sulfuric or sulfamic acid, the pH may be adjusted to 5–10 by removing the alkali by cation exchange.

According to the first aspect of the present invention, the mixture of an aqueous sulfonated amino resin solution with an amino group-containing substance may be heated at a temperature of from 50 to 150° C. for 5 to 6 hours after addition of a catalyst such as sulfuric acid, and then stabilized by diluting with water or adding an alkaline substance. Alternatively, the mixture of an aqueous sulfonated amino resin solution with an amino group-containing substance may be preliminarily heated to a temperature of from 50 to 150° C. before addition of a catalyst such as sulfuric acid, and then heated for 5 to 6 hours and stabilized by diluting with water or by adding of an alkaline substance.

The product obtained by reacting a sulfonated amino resin and an amino group-containing substance according to the first aspect of the present invention contains the sulfonated amino resin and the amino group-containing substance in a weight ratio of from 1:0.05 to 1:3. The weight ratio in the product can be measured by elemental analysis. If the sulfonated amino resin and the amino group-containing substance are reacted in a weight ratio larger than 1:3, unfavorable precipitation of the excess amino group-containing substance occurs, although the desired product is produced. It is also unfavorable to react them in a weight ratio less than 0.05, because the desired product is produced only in a small amount. In the production of the product obtained by reacting a sulfonated amino resin and an amino group-containing substance according to the first aspect of the present invention, the mixture of an aqueous sulfonated amino resin solution with an amino group-containing substance has a concentration of from 1 to 50 wt %. It is unfavorable that the concentration is less than 1 wt %, because such a low concentration results in reduction of productivity. A concentration higher than 50 wt % is also unfavorable because the viscosity of the mixture is too high. The concentration is preferably from 5 to 20 wt %.

The reaction temperature is preferably from 50 to 150° C. during formation of the condensation product from the mixture of an aqueous sulfonated amino resin solution with an amino group-containing substance. In the case of the reaction at a temperature higher than the boiling point of the aqueous medium, an autoclave may be used. Reaction temperature lower than 50° C. is unfavorable because the product is not formed enough. At a reaction temperature of higher than 150° C., the reaction is difficult to control though the product can be formed. Therefore, such a high reaction temperature is unfavorable. Particularly preferred reaction temperature is from 60 to 100° C. The reaction time for formation of the product is from 10 minutes to 20 hours, though it depends on the reaction temperature. If the reaction time is less than 10 minutes, the product can not be formed in a sufficient amount. The reaction may be terminated in 20 hours, and a reaction time longer than that is not economical.

According to the first aspect of the present invention, after the mixture of an aqueous sulfonated amino resin solution with an amino group-containing substance is heated at from 50° C. to 150° C., another batch of the aqueous sulfonated amino resin solution or the amino group-containing substance may be added to the mixture containing the product, followed by heating at from 50 to 150° C.

The product obtained by reacting a sulfonated amino resin and an amino group-containing substance according to the first aspect of the present invention is basically a particulate colloidal substance. Therefore, the solution of the product obtained the process according to the first aspect of the present invention is a colloidal solution (sol). The primary particle diameter of the colloidal particulate product is from 1 to 100 nm. Since the product is present in the solution as discrete particles or as aggregated particles, the colloidal solution of the product may be a transparent colorless solution or a transparent solution tinged with a colloidal color. According to the first aspect of the present invention, the product obtained by reacting an sulfonated amino resin and an amino group-containing substance is obtained in a sol as particles having a primary diameter of from 1 to 100 nm dispersed in a liquid medium. The liquid medium is preferably an aqueous medium. The primary particle diameter means, not a diameter of aggregates of the particles, but a diameter of discrete particles, and is measured visually by using an electron microscope. When primary particles gather together, aggregates are formed. The particle diameter of the aggregates can be measured by a dynamic light-scattering method by using an instrument such as $N_4$, manufactured by Coulter Inc. in U.S.A. The colloidal solution of the product has a viscosity of from 1.5 to 10000 mPa.S at a concentration of 10 wt % and undergoes gelation, which is peculiar to a colloidal solution.

The colloid of the product is basically amphoteric, having a negative charge attributable to the sulfonic acid groups and cationic sites attributable to the amino groups. The zeta potential of the colloid is from 0 to −60 mV.

According to the first aspect of the present invention, the pH of the solution of the product may be adjusted to 7–12 with an alkali metal hydroxide, sodium aluminate, sodium silicate, ammonia, an amine and the like. Since the free formaldehyde in the starting aqueous sulfonated amino resin solution reacts with an amino group-containing substance upon heating during the reaction to form an amino resin, the resulting solution of the product virtually contains no free formaldehyde.

The solution of the product obtained by reacting a sulfonated amino resin and an amino group-containing substance according to the first aspect of the present invention may be concentrated by evaporation, ultrafiltration or the like. Ultrafiltration can achieve removal of salts such as sodium sulfate in the solution simultaneously. The solution may be converted into a dry powder by means of a spray dryer, a drum dryer or the like. The dry powder forms a colloidal solution (sol) of particles of the product in water when dispersed in water again.

In general, an aqueous sulfonated amino resin solution is stabilized with caustic soda. According to the first aspect of the present invention the solution of the product obtained by reacting a sulfonated amino resin and an amino group-containing substance is stabilized with caustic soda. The solution of the above product may be stabilized with ammonia, an amine or calcium by passing the solution through a column packed with a cationic ion exchange resin having been exchanged by a cation such as ammonium ion, an amine or calcium. The solution of the product according to the first aspect of the present invention may be mixed with a surfactant such as a naphthalenesulfonate, lignin sulfonate or an alkylbenzenesulfonate, an anionic polymer such as a silica sol, bentonite or an anionic polyacrylamide or a water-soluble polymer such as polyvinyl alcohol, hydroxyethyl cellulose or carboxymethyl cellulose.

The sulfonated amino resin is a two-dimensional condensate usually having an average molecular weight of from 2,000 to 200,000, is negatively charged due to sulfonic acid groups, and is usually available in an aqueous colorless transparent polymer solution. When an amino group-containing substance with a small solubility in water such as melamine is added more than solubility in water to an aqueous solution of the sulfonated amino resin followed by heating, surprisingly, all the amino group-containing substance dissolves and does not precipitate even upon cooling. This is not explained only in terms of adsorption of the positively charged amino group-containing substance on the surfaces of the negatively charged sulfonated amino resin. This should be interpreted as the result of the depolymerization of the sulfonated amino resin upon heating in the presence of the amino group-containing substance and subsequent formation of the reaction product of the sulfonated amino resin and the amino group-containing substance through reaction between the depolymerization product and the amino group-containing substance. Namely, it is estimated that methylol groups (—$CH_2OH$) or sulfonic acid groups (—$SO_3H$) in the sulfonated amino resin and amino groups (—$NH_2$) in the amino group-containing substance undergo dehydration to form chemical bonds. An amino group-containing substance having at least two amino groups and a sulfonated amino resin form a three-dimensional reaction product. Therefore, the product is basically colloidal particulate products, and a solution of the product according to the first aspect.of the present invention is a colloidal solution (sol).

The cellulose fibers (A) to be used for the second aspect of the present invention are obtained by mechanical or chemical treatment of vegetable fiber sources. Pulp is a mass of cellulose fibers separated from vegetable sources and an intermediate product used for papermaking. Among vegetable sources used to make pulp such as wood, wheat, straw, common reed, kenaf, bagasse, bamboo and bamboo plant, wood is most widely used. Pulp is classified as chemical pulp, mechanical pulp, thermomechanical pulp and the like, according to the pulping process, namely the process of separating cellulose fibers from fiber sources, and any pulp may be used. Pulp made by treatment with chemicals is called chemical pulp. Mechanical pulp is made by beating raw materials by means of a beater and is represented by ground wood pulp. Thermomechanical pulp is made by heat treatment and mechanical grinding. According to the second aspect of the present invention, part of these fresh pulps may be replaced by waste paper.

As the inorganic filler material (B) used for the second aspect of the present invention, usual filler materials for paper which have negatively charged particle surfaces in an aqueous papermaking stock, such as kaolin clay, clay, titanium oxide, anionic heavy calcium carbonate, precipitated calcium carbonate, calcined clay, wollastonite, synthetic silica, talc, aluminum hydroxide, mineral fibers, glass fibers and perlite, may be used solely or in combination. The above-mentioned anionic filler particles may be used in combination with cationic calcium carbonate or the like.

The aqueous papermaking stock used for the second aspect of the present invention is a dispersion of the cellulose fibers (A) or the cellulose fibers (A) and the inorganic filler material (B) in water. Though the amount of the inorganic filler material (B) is not particularly restricted, it is preferable to add the inorganic filler material (B) to an aqueous papermaking stock so that the finished paper contains at most 150 wt % of the inorganic filler material (B), based on the cellulose fibers. A still larger amount of the inorganic filler material (B) may be added. The aqueous papermaking stock may contain sizing chemicals, fixers, antifoamers, slime control agents, dyes and other additives, so long as the object of the second aspect of the present invention can be achieved. The papermaking stock has a pH of from 4 to 10, preferably from 4 to 5.5 when used for the acid papermaking method, and from 5.5 to 10 when used for the neutral papermaking method.

The polymer (C) used for the second aspect of the present invention is preferably cationic or amphoteric. Cationic polymer means a polymer having cationic groups in its molecules. Amphoteric polymer means a polymer having both positive and negative groups on its chain. In amphoteric polymers, either positive (cationic) groups or negative (anionic) groups usually function dominantly. An amphoteric polymer with cationic dominance is preferable in respect of function. Polymers which may be used as component (C) include a cationic or amphoteric starch, a cationic or amphoteric polyacrylamide derivative, a cationic or amphoteric guar gum, a polydimethylaminoethyl methacrylate, a polyethyleneimine, a polyamide-polyamine-epichlorohydrin resin. These polymers may be used alone or as a combination of cationic ones, of amphoteric ones or of a cationic one and an amphoteric one. Preferable polymers used as component (C) are a cationic or amphoteric starch, a cationic or amphoteric polyacrylamide derivative and a mixture thereof. Particularly preferred are a cationic starch and a cationic polyacrylamide derivative.

A cationic starch, which may be used as component (C), is obtained by cationizing raw materials such as potato starch, corn starch, wheat starch, tapioca starch and an oxidized or hydrolyzed starch prepared therefrom, with a cationizing agent, by a wet method, a dry method, an organic solvent method or the like. As a cationizing agent, a quaternary ammonium chloride, a quaternary ammonium sulfate, a quaternary ammonium sulfamate and the like may be mentioned. As the quaternary ammonium group, 3-chloro-2-hydroxypropyl-trimethylammonium group and 2,3-epoxypropyl-trimethylammonium group may, for example, be mentioned. The degree of cationization of starch with a cationizing agent is represented by a degree of substitution. The degree of substitution is defined as the number of quaternary ammonium groups introduced via ether bonds per one glucose unit in the starch. Cationic starches having degrees of substitution of from 0.01 to 0.05 are preferably used for the second aspect of the present invention, and commercially available cationic starches may be used. These cationic starches may be aniodized by introducing functional groups such as carboxymethyl, sulfonic acid or phosphonic acid groups to the quaternary amines to form amphoteric starches.

Cationic or amphoteric polyacrylamide derivatives used as component (C) are obtained by cationizing a conventionally polymerized water-soluble polymer through a Mannich or Hofmann reaction of the amide groups (—$CONH_2$), by anionizing such a water-soluble polymer through partial hydrolytic carboxylation or sulfomethylation of the amide groups, by copolymerizing of sodium vinylsulfonate or acrylic acid with acrylamide to form an anionic polyacrylamide derivative, by copolymerizing a cationic monomer having a secondary, tertiary or quaternary amino groups such as dimethylaminoethyl methacrylate with acrylamide to form a cationic polyacrylamide, by cationizing the above-mentioned water-soluble polymer through a commonly known method, or by combinations thereof. The degree of substitution of the cationic group is at least 0.01, preferably at least 0.03, more preferably from 0.05 to 0.5. The polyacrylamide derivative has a molecular weight of at most 2,000,000, preferably at most 1,500,000, more preferably from 100,000 to 1,300,000.

As component (C), not only a cationic or amphoteric starch and a cationic or amphoteric polyacrylamide derivatives, a cationic or amphoteric guar gum, a polydimethylaminoethyl methacrylate, a polyethyleneimine and a polyamide-polyamine-epichlorohydrin resin may be used.

Guar gum is a galactomannan gum extracted from the albumen of seeds of an annual legume cyamopsistetragonolobus grown in India, Pakistan and Texas, U.S.A. A guar gum molecule consists of a mannan main chain made of D-mannopyranose units joined by $\beta(1\rightarrow 4)$ linkages, and a monosaccharide, D-galactopyranose, attached to this main chain by $\alpha-(1\rightarrow 6)$ linkages. Its cationic derivatives are obtained by reaction of hydroxyl groups in the polygalactomannan with a reactive quaternary ammonium compound. Such a cationic guar gum and an amphoteric guar gum which has both cationic and anionic characteristics are obtained by cationization or by cationization and anionization, as described as for starch. The degree of substitution is defined as the proportion of the number of the quaternary ammonium groups introduced in one guar gum molecule through formation of ether bonds to the total number of the mannose and galactose units in one guar gum molecule. The degree of substitution of the cationic groups is at least 0.01, preferably from 0.08 to 0.5. The molecular weight of the guar gum to be used is from 100,000 to 1,000,000, preferably from 200,000 to 300,000.

A polydimethylaminoethyl methacrylate has a cationic characteristic attributable to the tertiary amino groups.

A polyethyleneimine has (—$CH_2CH_2NH$—) linkages in its molecules and has a cationic characteristics attributable to the secondary amino groups. A polyethyleneimine is obtained by ring opening polymerization of ethyleneimine or by polycondensation of ethylene chloride and ethylenediamine.

A polyamide-polyamine-epichlorohydrin resin (PPE) is obtained, for example, by polycondensing adipic acid with diethylenetriamine to form polyamide-polyamine chains linked via acid amide bonds (—CONH—) and adding reaction of the amino groups in the polyamide-polyamine intermediate with epichlorohydrin followed by dehydrochlorination. Such a polyamide-polyamine-epichlorohydrin resin is a polyamide-polyamine having glycidyl groups in its molecule. A polyamide-polyamine-epichlorohydrin resin has cationic secondary and tertiary amino groups in the molecules.

As a product obtained by reacting a sulfonated amino resin and an amino group-containing substance., or component (D), used for the second aspect of the present invention, the product obtained by reacting a sulfonated amino resin and an amino group-containing substance in a weight ratio of from 1:0.05 to 1:3 according to the first aspect of the present invention may be used.

In the papermaking process according to the second aspect of the present invention, improvement in retention, drainage and productivity and improvement in strength of a paper sheet, formation and quality of a paper sheet can be achieved by adding a cationic or amphoteric polymer (C) and a product (D) obtained by reacting a sulfonated amino resin and an amino group-containing substance to a papermaking stock in a specific ratio. To an aqueous papermaking stock, component (C) and component (D) may be added in the form of solid or aqueous solution. In the case of aqueous solution, there is no particular restriction on the concentration.

To achieve improvement in retention, the amount of component (D) is at most 100 wt %, preferably from 1 to 50 wt %, based on the cationic or anionic polymer (C). The solid amount of component (D) is from 0.01 to 2.0 wt % in relation the solid amount of cellulose fibers, or the total solid amount of cellulose fibers and an inorganic filler material in an aqueous papermaking stock. The solid amount of component (C) is from 0.01 to 5.0 wt % in relation to the solid amount of cellulose fibers, or the total solid amount of cellulose fibers and an inorganic filler material in an aqueous papermaking stock.

In the process according to the second aspect of the present invention, either the cationic or amphoteric polymer (C) or the product (D) obtained by reacting a sulfonated amino resin and an amino group-containing substance may be added to an aqueous papermaking stock earlier. Another cationic substances such as an alumina sol, basic aluminum chloride, a cationic silica sol, aluminum sulfate and basic aluminum sulfate may be added to an aqueous papermaking stock at the same time as the cationic or amphoteric polymer (C), so long as the object of the second aspect of the present invention can be achieved.

According to the second aspect of the present invention, after addition of the cationic or amphoteric polymer (C) and the product (D) obtained by reacting a sulfonated amino resin and an amino group-containing substance, an aqueous papermaking stock is mixed enough and supplied to a papermaking machine in a usual way, and the resulting wet sheet is passed through the dehydration step and the drying step to form a finished paper.

In an aqueous papermaking stock, since negatively charged cellulose fibers and inorganic filler materials, strongly adsorb a cationic or amphoteric polymer on their surfaces, the cationic or amphoteric polymer forms flocks together with the cellulose fibers and the inorganic filler and hence improves drainage and retention during sheeting and strength and formation of the finished paper, even in the absence of anions. However, because cellulose fibers and an inorganic filler material have only small negative charges and are large in size as compared with the polymer, such flocks are weak and easy to break by strong mechanical shearing force, and a cationic polymer alone is not effective enough to improve retention, drainage and productivity.

To improve drainage, retention, productivity and quality of a paper sheet, a dual polymer system is employed. In the dual polymer system, both cationic and anionic polymers are used, and by addition of an anionic polymer having a large negative charge, flocks made by the single action of a cationic polymer become much stronger. The papermaking process according to the second aspect of the present invention is a kind of dual polymer system, and is based on the same mechanism as a usual dual polymer system.

However, the second aspect of the present invention is characterized in that a product (D) obtained by reacting a sulfonated amino resin and an amino group-containing substance is used as an anionic polymer.

Component (D) is a colloid having a primary particle diameter of from 1 to 100 nm and an average particle diameter of from 5 to 500 nm as measured by a dynamic light-scattering method in solution. Although, component (D) has a negative charge as a whole, it has an amphoteric characteristic with strong anion sites attributable to sulfonic acid groups and weak cation sites attributable to amino groups. Therefore, it can be adsorbed strongly both by anionic cellulose fibers and inorganic filler material and by a cationic or amphoteric polymer, and acts as a strong flocculant forming strong flocks consisting of cellulose fibers (A), the inorganic filler material (B), the cationic or amphoteric polymer (C) and the product (D) obtained by reacting sulfonated amino resin and an amino group-containing substance.

Conventional anionic polymers never show such an action. For example, conventional sulfonate-containing melamine-formaldehyde condensates (SMF) are linear water-soluble polymers and dissolve in water. Unlike conventional SMF, the product (D) obtained by reacting a sulfonated amino resin and an amino group-containing substance used for the second aspect of the present invention forms micro aggregates having a particle diameter of a colloid level by virtue of the combination of a sulfonated amino resin oligomer having negative sites with an amino group-containing substance having positive sites such as melamine. A solution of the product (D) obtained by reacting a sulfonated amino resin and an amino group-containing substance used for the second aspect of the present invention is a stable colloidal solution. When a solution of component (D) is added to a pulp slurry containing cellulose fibers, an inorganic filler material and an ionic polymer before sheeting, component (D), which has both cation sites and anion sites and a large specific surface, is adsorbed by ionic components in the pulp slurry and shows a remarkable flocculation ability, forming flocks. Hence, it acts as an excellent retention aid. As compared with conventional sulfonate-containing melamine formaldehyde condensates dissolved in water, component (D) in colloidal state used for the second aspect of the present invention, which renders flock formation easier, is effective as an additive for papermaking.

Therefore, the papermaking process according to the second aspect of the present invention which is characterized by use of a cationic or amphoteric polymer, is remarkably effective in a wide variety of papermaking methods from the acid papermaking method to the neutral papermaking method for improving retention, drainage, productivity and quality of the finished paper such as strength and formation.

BEST MODE FOR CARRYING OUT THE INVENTION

Figure 1:
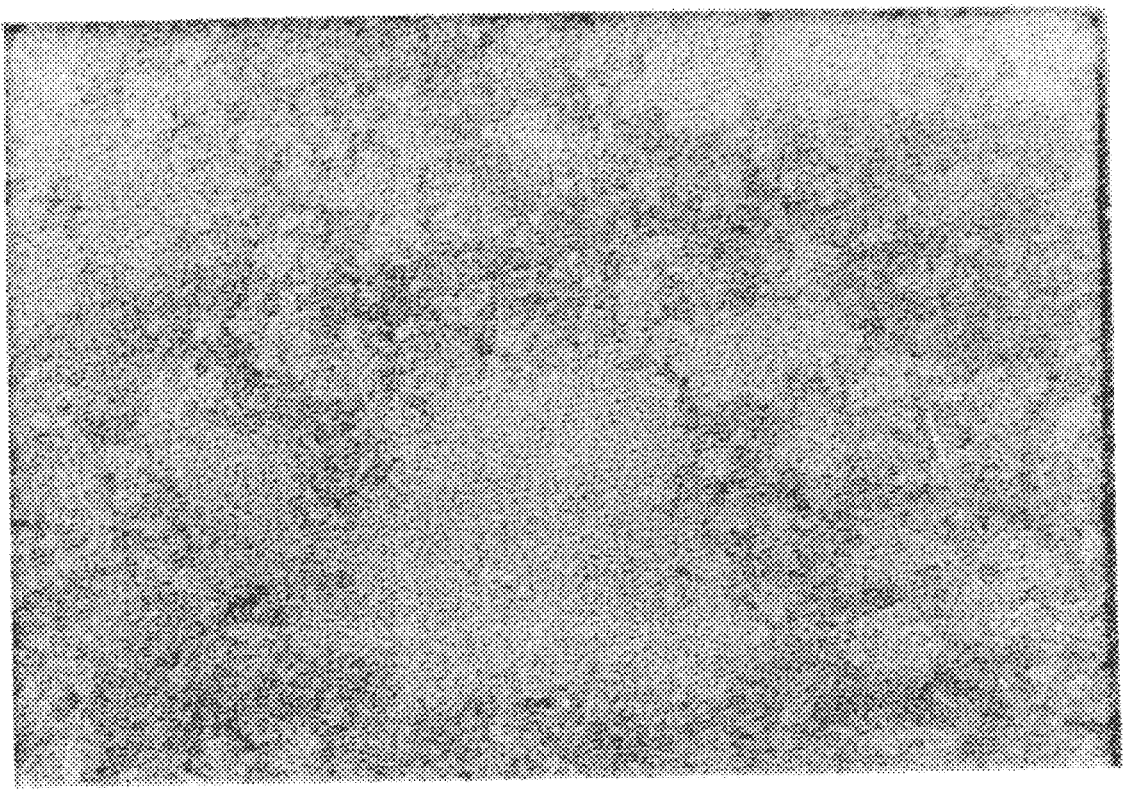
FIG. 1 is a transmission electron micrograph of the product obtained in Preparation Example 2 by reacting a sulfonated amino resin and amino group-containing substance. The magnification is 200,000.

As products (D) obtained by reacting a sulfonated amino resin and an amino group-containing substance, products (D1) to (D6) and (D'1) to (D'2) were prepared in the following Preparation Examples (D1) to (D6) and Comparative Preparation Examples (D'1) to (D'2).

PREPARATION EXAMPLE (D1)

200 g of an aqueous sulfonated amino resin solution prepared by an known method [an aqueous solution of a sodium sulfonate-containing melamine-formaldehyde condensate, specific gravity 1.214 (measured at 20° C.), pH 8.50, viscosity 23.9 mPa.S (measured at 20° C.), electrical conductivity 31.00 mS/cm, solid sulfonated amino resin content 32.9 wt % (containing 14.4 wt % as melamine), molar ratio of formaldehyde/sulfonic acid 3.6, free formaldehyde (measured by titration) 0.7 wt %, molar ratio of formaldehyde/melamine 3.50, average molecular weight 15,000, transmittance (L value) 99.8%, colorless transparent liquid], (containing 65.8 g of the sulfonated amino resin) and 690 g of pure water were put in a four-necked flask of 2 l equipped with a reflux condenser, a stirrer and a thermometer. 3.5 g of 10% sulfuric acid and then 39.0 g of melamine (manufactured by Nissan Chemical Industries, Ltd.) were added with stirring. The total solid content of this mixed solution of the sulfonated amino resin and melamine was 11.2 wt %, the weight ratio of melamine/the sulfonated amino resin in the mixed solution was 0.593, and the pH of the mixed solution was 7.50. This mixed solution was allowed to react by heating at 98° C. for 2 hours and then cooled to obtain 932.5 g of a solution of a product (D1) obtained by reacting the sulfonated amino resin and melamine. During the heating, this mixed solution turned transparent at a temperature of from 80 to 90° C. where the melamine completely dissolved, and then became tinged with colloidal color.

The solution of the product (D1) thus obtained was a transparent solution slightly tinged with colloidal color and had a specific gravity of 1.056 (measured at 25° C.), a pH value of 8.13, a viscosity of 2.4 mPa.S (measured at 25° C.), a solid product content of 11.2 wt %, a weight ratio of melamine/the sulfonated amino resin of 0.593, a molar ratio of formaldehyde/sulfonic acid of 3.6, a molar ratio of formaldehyde/melamine of 1.49, an average particle diameter measured by a dynamic light scattering method of 16.1 nm (measured by means of Coulter $N_4$ manufactured by Coulter Inc. in U.S.A.) and a zeta potential of –10 mV. The primary particle diameter of the product measured under an electron microscope was from 5 to 10 nm. No free formaldehyde was detected in this solution by titration, and this solution was stable at room temperature for at least 6 months.

PREPARATION EXAMPLE (D2)

120 g of the same aqueous sulfonated amino resin solution as used in Preparation Example (D1) [an aqueous solution of a sodium sulfonate-containing melamine-formaldehyde condensate] (containing 39.5 g of the sulfonated amino resin) and 615 g of pure water were put in a four-necked flask of 2 l equipped with a reflux condenser, stirrer and a thermometer, and 4.3 g of 10% sulfuric acid and then 21.4 g of melamine (manufactured by Nissan Chemical Industries, Ltd.) were added with stirring. The total solid content of the mixed solution of the sulfonated amino resin and melamine was 8.0 wt %, the weight ratio of melamine/the sulfonated amino resin was 0.542, and the pH was 6.75. The mixed solution was allowed to react at 98° C. for 2.5 hours by heating. The resulting solution of the product (D2) was tinged with colloidal color. Then, 36 g of the same aqueous sulfonated amino resin solution as used in Preparation Example (D1) (containing 11.8 g of the sulfonated amino resin) was added, it was allowed to react at 98° C. for 3.5 hours. Then, 2.6 g of 10% aqueous caustic soda solution was added, and the mixture was heated at 98° C. for 10 minutes and cooled to obtain 920.7 g of a solution of a product (D2) obtained by reacting the sulfonated amino resin and melamine.

The solution of the product (D2) thus obtained was a highly transparent solution tinged with colloidal color, and had a specific gravity of 1.039 (measured at 25° C.), a pH of 9.62, a viscosity of 5.2 mPa.S (measured at 25° C.), an electrical conductivity of 13.30 mS/cm, a solid product content of 7.90 wt %, a weight ratio of melamine/the sulfonated amino resin of 0.417, a molar ratio of formaldehyde/sulfonic acid of 3.6, a molar ratio of formaldehyde/melamine of 1.79, an average particle diameter measured by a dynamic light-scattering method of 103 nm, a zeta potential of –12 mV and a transmittance (L value) of 86.7%. No free formaldehyde was detected in the solution by titration. The primary particle diameter of the product measured under an electron microscope was from 5 to 10 nm. The solution of the product was stable at room temperature for at least 6 months.

PREPARATION EXAMPLE (D3)

200 g of the same aqueous sulfonated amino resin solution [aqueous solution of a sodium sulfonate-containing melamine-formaldehyde condensate] as used in Preparation Example (D1) (containing 65.8 g of the sulfonated amino resin) and 589 g of pure water were put in a four-necked flask of 2 l equipped with a reflux condenser, a stirrer and a thermometer. 4.0 g of 10% sulfuric acid and then 39.0 g of melamine (manufactured by Nissan Chemical Industries, Ltd.) were added with stirring. The solid content of the mixed solution of the sulfonated amino resin and melamine was 12.6 wt %, the weight ratio of melamine/the sulfonated amino resin was 0.593, and the pH was 7.31. The mixed solution was allowed to react by heating at 98° C. for 2 hours, and 2 g of 10% caustic soda and 40 g of the same aqueous sulfonated amino resin solution as used in Preparation Example (D1) (containing 13.2 g of the sulfonated amino resin) were added. The reaction mixture was allowed by react at 98° C. for 1.5 hours and cooled to obtain 912 g of a solution of a product (D3) obtained by reacting the sulfonated amino resin and melamine.

The solution of the product (D3) thus obtained was a transparent solution slightly tinged with colloidal color and had a specific gravity of 1.067 (measured at 25° C.), a pH of 8.79, a viscosity of 2.6 mPa.S (measured at 25° C.), an electrical conductivity of 17.90 mS/cm, a solid product content of 12.9 wt %, a weight ratio of melamine/the sulfonated amino resin of 0.494, a molar ratio of formaldehyde/sulfonic acid of 3.6, a molar ratio of formaldehyde/melamine of 1.64, an average particle diameter measured by a dynamic light-scattering method of 16.3 nm, a zeta potential of –12 mV and a transmittance (L value) of 96.9%. No free formaldehyde was detected in the solution by titration. The primary particle diameter of the product measured under an electron microscope was from 5 to 10 nm. The solution was stable at room temperature at least 6 months.

PREPARATION EXAMPLE (D4)

600 g of the same aqueous sulfonated amino resin solution [an aqueous solution of a sodium sulfonate-containing melamine-formaldehyde condensate] as used in Preparation Example (D1) (containing 197.4 g of the sulfonated amino resin) and 1,200 g of pure water were put in a four-necked flask of 2 l equipped with a reflux condenser, a stirrer and a thermometer. 24 g of 10% sulfuric acid and then 81 g of melamine (manufactured by Nissan Chemical Industries, Ltd.) were added with stirring. The total solid content of the mixed solution of the sulfonated amino resin and melamine was 14.6 wt %, the weight ratio of melamine/the sulfonated amino resin was 0.41, and the pH was 6.83. The mixed solution was allowed to react by heating at 92° C. for 6 hours, and 960 g of pure water was added. After cooling, 16 g of 10 wt % aqueous NaOH solution was added to obtain 2,881 g of a solution of a product (D4) obtained by reacting the sulfonated amino resin and melamine. During the heating, the mixed solution turned transparent at a temperature of from 80 to 90° C. where the melamine completely dissolved, and then became tinged with colloidal color.

The solution of the product (D4) thus obtained was a transparent solution slightly tinged with colloidal color and had a specific gravity of 1.044 (measured at 25° C.), a pH of 10.38, a viscosity of 65 mPa.S (measured at 25° C.), a solid product content of 10.0 wt %, a weight ratio of melamine/the sulfonated amino resin of 0.41, a molar ratio of formaldehyde/sulfonic acid of 3.6, a molar ratio of formaldehyde/melamine of 1.81, an average particle diameter measured by a dynamic light-scattering method of 179 nm (measured by means of Coulter $N_4$, manufactured by Coulter Inc. in U.S.A.) and a zeta potential of −10 mV. The primary particle diameter of the product (D4) measured under an electron microscope was from 5 to 10 nm. No free formaldehyde was detected in this solution by titration. The solution was stable at room temperature for at least 6 months.

PREPARATION EXAMPLE (D5)

600 g of the same aqueous sulfonated amino resin solution [an aqueous solution of a sodium sulfonate-containing melamine-formaldehyde condensate] as used in Preparation Example (D1) (containing 197.4 g of the sulfonated amino resin) and 1,000 g of pure water were put in a four-necked flask of 2 l equipped with a reflux condenser, a stirrer and a thermometer. 24 g of 10% sulfuric acid and then 69 g of melamine (manufactured by Nissan Chemical Industries, Ltd.) were added. The total solid content of the mixed solution of the sulfonated amino resin and melamine was 15.7 wt %, the weight ratio of melamine/the sulfonated amino resin was 1.40, and the pH was 6.65. The mixed solution was allowed to react by heating at 93° C. for 7 hours, and 1,083 g of warm pure water at 48° C. was added. After maintained at 82° C. for 1 hour, the mixed solution was cooled to 60° C., and after addition of 14 g of 10% NaOH aqueous solution, it was cooled further, to obtain 2,790 g of a product (D5) obtained by reacting the sulfonated amino resin and melamine. During the heating, the mixed solution turned transparent at a temperature of from 80 to 90° C., where the melamine completely dissolved, and then became tinged with colloidal color.

The solution of the product (D5) thus obtained was a transparent solution slightly tinged with colloidal color, and had a specific gravity of 1.042 (measured at 25° C.), a pH of 9.73, a viscosity of 17.8 mPa.S (measured at 25° C.), a solid product content of 10.0 wt %, a weight ratio of melamine/the sulfonated amino resin of 1.40, a molar ratio of formaldehyde/sulfonic acid of 3.6, a molar ratio of formaldehyde/melamine of 1.95, an average particle diameter measured by a dynamic light-scattering method of 135 nm (measured by means of Coulter $N_4$, manufactured by Coulter Inc. in U.S.A.) and a zeta potential of −12 mV. The primary particle diameter of the product (D5) measured under an electron microscope was from 5 to 10 nm. No free formaldehyde was detected in the solution by titration. The solution was stable at room temperature for at least 6 months.

PREPARATION EXAMPLE (D6)

400 g of the same aqueous sulfonated amino resin solution [an aqueous solution of a sodium sulfonate-containing melamine-formaldehyde condensate] as used in Preparation Example (D1) (containing 131.6 g of the sulfonated amino resin) and 360 g of pure water were put in a four-necked flask of 2 l equipped with a reflux condenser, a stirrer and a thermometer. 14.0 g of melamine (manufactured by Nissan Chemical Industries, Ltd.) was added with stirring. The solid content of the mixed solution of the sulfonated amino resin and melamine was 18.8 wt %, the weight ratio of melamine/ the sulfonated amino resin was 0.106, and the pH of the solution was 8.4. The mixed solution was allowed to react by heating at 70° C. for 3 hours, and then cooled. After 5 g of 10% caustic soda was added, the mixed solution was stirred at room temperature for 30 minutes to obtain 779 g of a product (D6) obtained by reacting the sulfonated amino resin and melamine.

The solution of the product (D6) was a colorless transparent solution and had a specific gravity of 1.110 (measured at 25° C.), a pH of 11.90, a viscosity of 3.0 mPa.S (measured at 25° C.), a solid product content of 18.7 wt %, a weight ratio of melamine/the sulfonated amino resin of 0.106, a molar ratio of formaldehyde/sulfonic acid of 3.6, a molar ratio of formaldehyde/melamine of 2.82, and an average particle diameter measured by a dynamic light-scattering method of 5.8 nm. The primary particle diameter of the product (D6) measured under an electron microscope was from 5 to 10 nm. The solution of the product (D6) was stable at room temperature for at least 6 months.

COMPARATIVE PREPARATION EXAMPLE (D'1)

140 g of the same aqueous sulfonated amino resin solution [an aqueous solution of a sodium sulfonate-containing melamine-formaldehyde condensate] as used in Preparation Example (D1) (containing 46.1 g of the sulfonated amino resin) and 700 g of pure water were put in a four-necked flask of 2 l equipped with a reflux condenser, a stirrer and a thermometer. 5.0 g of 10% sulfonic acid and then 25 g of melamine (manufactured by Nissan Chemical Industries, Ltd.) were added with stirring. The total solid content of the mixed solution of the sulfonated amino resin and melamine was 8.18 wt %, the weight ratio of melamine/the sulfonated amino resin was 0.542, and the pH was 6.75. The reaction of the mixed solution was attempted by heating at 40° C. for 12 hours. However, the melamine did not dissolve, and the mixed solution remained a mixed slurry containing the undissolved melamine in the aqueous resin solution.

COMPARATIVE PREPARATION EXAMPLE (D'2)

14 g of the same aqueous sulfonated amino resin solution [an aqueous solution of a sodium sulfonate-containing melamine-formaldehyde condensate] as used in Preparation Example (D1) (containing 4.6 g of the sulfonated amino resin), 700 g of pure water and 50 g of melamine (manufactured by Nissan Chemical Industries, Ltd.) were put in a four-necked flask of 2 l equipped with a reflux condenser, a stirrer and a thermometer. The total solid content of the mixed solution of the sulfonated amino resin and melamine was 7.15 wt %, the weight ratio of melamine/ the sulfonated amino resin was 10.9, and the pH of the mixed solution was 9.60. The mixed solution was allowed to react by heating at 98° C. for 6 hours and cooled. The mixed solution became transparent in 2 hours during the heating, but it was not tinged with colloidal color and remained transparent even after 6 hours of heating. On cooling, the mixed solution separated into two layers with a considerable amount of melamine separating out, and thus no uniform composite solution was obtained. The upper layer was tinged with colloidal color, which showed formation of a product, but the weight ratio of melamine/sulfonated amino resin in the product was 3.0.

EXAMPLE 1

(i) Preparation of Pulp Slurry

A softwood kraft dry bleached pulp (A1) and a hardwood kraft dry breached pulp (A2) were supplied as cellulose fibers (A).

90 g of the softwood kraft dry bleached pulp (A1) and 270 g of the hardwood kraft dry breached pulp (A2) were added to 25 kg of water, and left in it all day long. These pulps were beated in a laboratory beater to a freeness of 350 ml according to Canadian standards to obtain a pulp slurry.

(ii) Preparation of Aqueous Papermaking Stocks

Heavy calcium carbonate (B1), an aqueous aluminum sulfate solution (B2) and kaolin (China clay: B3) were supplied as inorganic filler materials (B), and a rosin size (E) as an organic filler material.

① To the slurry of pulps (A1+A2), the heavy calcium carbonate (B1), water and sulfuric acid were added to obtain a neutral aqueous papermaking stock (α) having a pulp content of 0.35 wt %, a heavy calcium carbonate content of 0.15 wt % and a pH of 7.1.

② To the slurry of pulps (A1+A2), the aqueous aluminum sulfate solution (B2), kaolin (China clay: B3), a rosin size (E1), water and sulfuric acid were added to prepare an aqueous papermaking stock (β) of pH 4.5 having a pulp content of 0.35 wt %, a kaolin content of 0.15 wt %, a aluminum sulfate (octadecahydrate) content of 0.0035 wt %, a rosin size content of 0.0015 wt % and a kaolin/pulp weight ratio of 0.43 wt %.

(iii) Preparation of Aqueous Solutions of Cationic Polymers (C)

As cationic polymers (C), a cationic starch (C1) and a cationic polyacrylamide (C2) as described below were supplied.

① By cationizing potato starch, a 0.5 wt % aqueous solution of a cationic starch (C1) was prepared. The nitrogen content and the degree of substitution of the cationic starch (C1) were 0.35% and 0.042, respectively.

② A commercial cationic polyacrylamide (C2) which was as a flocculant for papermaking stock in the form of a slurry containing 15 wt % of the active ingredient was diluted with pure water to obtain an aqueous solution containing 0.5 wt % of the active ingredient.

(iv) Addition Method

To the slurry of beater pulps (A1+A2), additives such as heavy calcium carbonate (B1), an aqueous aluminum sulfate solution (B2), kaolin (China clay: B3) and, if necessary, a rosin size (E1) were added to prepare acidic and neutral papermaking stocks. After addition of a cooking solution of cationic potato starch (C1) cationized with quaternary ammonium chloride, an aqueous solution of a cationic polyacrylamide (C2) and solutions of the products (D1) to (D5) obtained by reacting a sulfonated amino resin and an amino group-containing substance in the preceding Preparation Examples (D1) to (D5), these stocks were sheeted, and the retention of fines was measured.

(v) Method of Measuring the Retention of Fines

The retention was measured as follows in accordance with a Dynamic Drainage Jar Test Method (which is also called a Britt-Jar Test Method) disclosed in Tappi (Britt. K. W.: Tappi, 56(10), 46–50, 1973).

① The total concentrations G wt % of the pulps (A1+A2) and inorganic filler materials (B1) to (B3) in the papermaking stocks were accurately calculated.

② After a surfactant was added to make passage of the fines easy, a papermaking stocks was filtered on a 200-mesh wire screen. The remainder on the screens was weighed to calculate the ratio F wt % of the total fines which passed through the wire screens to the total of the pulps and the filler materials in the papermaking stock. The total fine concentrations of the papermaking stock is expressed as G×F/100 wt %.

③-1) 500 ml of a papermaking stock was poured into a jar and stirred at a rotational speed of 800 rpm, and timing was started. After 15 seconds, the predetermined amount of a cooking solution of cationic starch (C1) (starch concentration 0.5 wt %) was added, and 30 seconds after the beginning of the timing, a predetermined amount of a solution of one of the products (D1) to (D3) obtained by reacting a sulfonated amino resin and an amino group-containing substance in Preparation Examples (resin concentration 0.5 wt %) was added. 45 seconds after the beginning of the timing, drainage was started, and white water was collected for 30 seconds. The volume of the collected white water Y ml was measured. A 200-mesh wire screen was used, and the diameter of the drain was controlled so that about 100 ml of white water was drained in 30 seconds.

③-2) 500 ml of a papermaking stock was poured into a jar and stirred at a rotational speed of 1,000 rpm, and timing was started. After 15 seconds, a predetermined amount of 0.5 wt % aqueous solution of cationic polyacrylamide (C2) was added. 45 seconds after the beginning of the timing, a predetermined amount of a solutions of the products (D4) or (D5) (resin concentration 0.5 wt %) obtained in Preparation Examples by reacting a sulfonated amino resin and an amino group-containing substance was added. 60 seconds after the beginning of the timing, drainage was started, and white water was collected for 30 seconds. The volume of the collected white water Y ml was measured. A 200-mesh wire screen was used, and the diameter of the drain was controlled so that about 100 ml of white water was drained in 30 seconds.

④ Each white water collected in ③ was filtered through quantitative filter paper having a dry weight $W_1$ g, and after the filter paper was dried, the weight of the filter paper $W_2$ g was measured. $W_2-W_1$ represents the weight of the fines in Y ml of white water drained through a wire screen.

⑤ The ratio of the fines obtained on the wire screen to the total fines in a papermaking stock, namely the retention of fines Z(%) is given by $Z=((G\times F)-(10,000(W_2-W_1)/Y))\div(G\times F)\times 100$.

(vi) Measurement of the Retentions of Fines and the Results

The ratio of the total fines in the papermaking stocks (α) prepared in preceding step (ii), F, was 35 wt %. When nothing was added to the papermaking stock, 13.5 wt % of the fines was retained. After C1 or C2, and D1, D2 or D3 were added to the papermaking stocks in the amounts as shown in Table 1, retentions (%) of fines were measured. The results are shown in Table 1. In Table 1, the amounts of cationic starch (C1) and cationic polyacrylamide (C2) are represented by solid content weight % to the total solid amount of cellulose fibers (A1) and (A2) and an inorganic filler material (B). The amounts of the product (D1) to (D5) obtained by reacting a sulfonated amino resin and an amino group-containing substance were represented by solid content weight % to the total solid amount of cellulose fibers (A1) and (A2) and an inorganic filler material (B). As for Examples 2 to 21, the retentions (%) of fines were measured similarly.

TABLE 1

| Example | Papermaking stock | pH | Component C | Amount of component C | Component D | Amount of component D | Retention |
|---|---|---|---|---|---|---|---|
| 1 | α | 7.1 | C1 | 1.0 | D1 | 0.1 | 72.5 |
| 2 | α | 7.1 | C1 | 1.0 | D1 | 0.2 | 86.0 |
| 3 | α | 7.1 | C1 | 1.0 | D1 | 0.3 | 90.0 |
| 4 | α | 7.1 | C1 | 1.0 | D2 | 0.1 | 69.0 |
| 5 | α | 7.1 | C1 | 1.0 | D2 | 0.2 | 84.5 |
| 6 | α | 7.1 | C1 | 1.0 | D2 | 0.3 | 91.0 |
| 7 | α | 7.1 | C1 | 1.0 | D3 | 0.1 | 78.0 |
| 8 | α | 7.1 | C1 | 1.0 | D3 | 0.2 | 88.4 |
| 9 | α | 7.1 | C1 | 1.0 | D3 | 0.3 | 92.0 |
| 10 | α | 7.1 | C1 | 1.0 | D4 | 0.1 | 70.5 |
| 11 | α | 7.1 | C1 | 1.0 | D4 | 0.2 | 84.6 |
| 12 | α | 7.1 | C1 | 1.0 | D4 | 0.3 | 95.6 |
| 13 | α | 7.1 | C1 | 1.0 | D5 | 0.1 | 71.6 |
| 14 | α | 7.1 | C1 | 1.0 | D5 | 0.2 | 87.3 |
| 15 | α | 7.1 | C1 | 1.0 | D5 | 0.3 | 95.5 |
| 16 | α | 7.1 | C2 | 0.08 | D4 | 0.02 | 81.3 |
| 17 | α | 7.1 | C2 | 0.08 | D4 | 0.04 | 91.5 |
| 18 | α | 7.1 | C2 | 0.08 | D4 | 0.08 | 93.9 |
| 19 | β | 4.5 | C2 | 0.08 | D4 | 0.02 | 52.0 |
| 20 | β | 4.5 | C2 | 0.08 | D4 | 0.04 | 63.5 |
| 21 | β | 4.5 | C2 | 0.08 | D4 | 0.08 | 71.2 |

COMPARATIVE EXAMPLES 1 to 9

In Comparative Example 1, the retention was measured by using a papermaking stock (α) itself. In Comparative Examples 2 to 4, retentions (%) of fines were measured in the same manner as in Example 1 except that none of the products (D1) to (D5) obtained by reacting a sulfonated amino resin and an amino group-containing substance were added. In Comparative Example 5 to 9, retentions (%) of fines were measured in the same manner as in Example 1 except that instead of the products (D1) to (D5) obtained by reacting a sulfonated amino resin and an amino group-containing substance, an aqueous sulfonated amino resin solution [an aqueous solution of a sodium sulfonate-containing melamine-formaldehyde condensate (SMF), which was a colorless transparent solution having a specific gravity of 1.214 (measured at 20° C.), a pH of 8.50, a viscosity of 23.9 mPa.S (measured at 20° C.), an electrical conductivity of 31.00 mS/cm, a solid sulfonated amino resin content of 32.9 wt % (containing 14.4 wt % as melamine), a formaldehyde/sulfonic acid molar ratio of 3.6, a free formaldehyde concentration of 0.7 wt % (measured by titration), a formaldehyde/melamine molar ratio of 3.50, an average molar weight of 15,000 and a transmittance (L value) of 99.8%] was used. The results are shown in Table 2. In Table 2, the amount (solid matter) of the sodium sulfonate-containing melamine-formaldehyde condensate (SMF) was represented by solid content weight % to the total solid amount of cellulose fibers (A1) and (A2) and an inorganic filler material

TABLE 2

| Comparative Example | Papermaking stock | pH | Component C | Amount of component C | Amount of SMF | Retention |
|---|---|---|---|---|---|---|
| 1 | α | 7.1 | — | 0 | 0 | 13.5 |
| 2 | α | 7.1 | C1 | 1.0 | 0 | 38.0 |
| 3 | α | 7.1 | C2 | 0.08 | 0 | 46.0 |
| 4 | β | 4.5 | C2 | 0.08 | 0 | 23.0 |
| 5 | β | 4.5 | C2 | 0.08 | 0.03 | 24.5 |
| 6 | β | 4.5 | C2 | 0.08 | 0.3 | 25.2 |
| 7 | α | 7.1 | C1 | 1.0 | 0.1 | 48.0 |
| 8 | α | 7.1 | C1 | 1.0 | 0.2 | 51.5 |
| 9 | α | 7.1 | C1 | 1.0 | 0.3 | 49.0 |

(vii) Drainage Measurement and the Results

① An aqueous papermaking stock (α) prepared in the receding step (ii) was diluted with water to a total oncentration of pulps and filler materials of 0.3 wt %. 1,000 g of the diluted papermaking stock was stirred at a rotational speed of 1,000 rpm, and 15 seconds after the beginning of the stirring, 6 ml of a 0.5 wt % aqueous solution of a cationic starch (C1) was added. After a predetermined period of stirring, a 0.5 wt % aqueous solution of (D1) obtained in Preparation Example 1 was added, and the papermaking stock was stirred for 15 seconds and immediately, the drainage (ml) was measured by using a Canadian Standard Freeness Tester. In Examples 22 to 26, the amount of (D1), to the total amount of pulps and filler materials, was varied as shown in Table 3.

② An aqueous papermaking stock (α) prepared in the preceding step (ii) was diluted with water to a total of pulp and filler material concentration of 0.3 wt %. 1,000 g of the diluted papermaking stock was stirred at a rotational speed of 1,200 rpm, and 15 seconds after the beginning of the stirring, 3 ml of a 0.08 wt % aqueous solution of a cationic polyacrylamide (C2) was added. After a predetermined period of stirring, a 0.1 wt % aqueous solution of (D1) prepared in Preparation Example 1 was added. Immediately after 15 seconds of stirring, the drainage (ml) was measured by using a Canadian Standard Freeness Tester. In Examples 27 to 31, the amount of (D1), to the total amount of the pulps and the filler material, was varied as shown in Table 3.

TABLE 3

| Example | Rotational speed (rpm) | Component C | Amount of component D1 (ml) | Drainage (ml) |
|---|---|---|---|---|
| 22 | 1000 | C1 | 0 | 530 |
| 23 | 1000 | C1 | 0.6 | 635 |
| 24 | 1000 | C1 | 1.2 | 675 |
| 25 | 1000 | C1 | 1.8 | 685 |
| 26 | 1000 | C1 | 2.4 | 698 |
| 27 | 1200 | C2 | 0 | 558 |
| 28 | 1200 | C2 | 0.6 | 671 |
| 29 | 1200 | C2 | 1.2 | 669 |
| 30 | 1200 | C2 | 1.8 | 705 |
| 31 | 1200 | C2 | 3.0 | 713 |

Table 1 shows that the papermaking process of the present invention enables cellulose fibers (A), an inorganic filler material (B), a cationic polymer (C) and a product (D) obtained by reacting a sulfonated amino resin and an amino group-containing substance to flocculate satisfactorily in a papermaking stock within a neutral pH range, and therefore can attain in good retention during sheeting. In addition, increase in retention with increase in the amount of component (D) indicates that component (D) acts as an effective retention aids in the above compositions. The freeness tests in the above Examples proved good drainage.

Table 2 shows that when only components (A), (B) and (C) were added, and component (D) was not added, the retentions were from 38.0 to 46.0%. When a sodium sulfonate-containing melamine-formaldehyde condensate (SMF) was used instead of component (D) used in the present invention, the retention was from 48.0 to 51.5%, and good retention was not attained by using an aqueous papermaking stock within a neutral pH range. In Comparative Examples 7 to 9, even if the amount of SMF was increased, the retention did not exceeds about 50%, and therefore still higher retention can not attained with respect to a composition containing SMF. Similar freeness tests of the papermaking stocks of Comparative Examples 7 to 9 did not give good results.

When component (C) was added alone or in combination with SMF to an acidic papermaking stock having a pH of about 4.5, good retention was not attained. But when components (C) and (D) were added to the acidic papermaking stock, retention was improved.

In the present invention, retention can be improved satisfactorily in sheeting an acidic papermaking stock having a pH of from 4 to 5.5 or a neutral to weakly alkaline papermaking stock having a pH of 5.5 to 10.

INDUSTRIAL APPLICABILITY

The product obtained by reacting a sulfonated amino resin and an amino group-containing substance of the present invention acts as a retention aid in a papermaking process comprising sheeting an aqueous papermaking stock containing cellulose fibers or cellulose fibers and an inorganic filler material, followed by removal of water and drying, when used in combination with a cationic polymer such as a cationic starch, a cationic polyacrylamide derivative, an amphoteric starch or an amphoteric polyacrylamide derivative. In the present invention, when a cationic or amphoteric polymer and a product obtained by reacting a sulfonated amino resin and an amino group-containing substance are added to an aqueous papermaking stock, cellulose fibers, an inorganic filler material, the cationic or amphoteric polymer and the product obtained by reacting a sulfonated amino resin and an amino group-containing substance form flocks in the papermaking stock, and the strongly bonded flocks are tough enough to resist the actions by impurities, electrolytes, shearing force and the like in the papermaking stock and consistently leads to improved retention and drainage in sheeting step. From the improved retention and drainage, enormous advantages in a papermaking process such as improved productivity for the finished paper, reduced cost for treating white water, more efficient reuse of white water, reduced heat energy required in the drying step, and improved durability of papermaking machines can be derived. Further, the finished paper obtained by the papermaking process of the present invention has good strength by virtue of an amino resin, which can increase strength of a paper sheet, and is excellent in quality and formation.

The product obtained by reacting a sulfonated amino resin and amino group-containing substance can be used as a dispersant for inorganic powders such as refractory powders and pigments and for organic powders such as phenol resin powders and, as an anti-dusting agent for various powders such as a silica powder, and as an antistatic agent for paper, fibers, plastics and film.

The product obtained by reacting a sulfonated amino resin and an amino group-containing substance can be used as a water-reducing agent for concrete and for gypsum and an admixture for the earth pressure shield tunneling method, and can be used in combination with a silica sol, as a grout agent, as a flocculant for clarification of waste water, as a flocculant for molding inorganic fibers and as a gelling agent.

We claim:

1. A product obtained by reacting a sulfonated amino resin and an amino group-containing substance selected from the group consisting of melamine and melamine in admixture with urea, a guanamine, dicyandiamide, an amine, an acid amide, a phenol or a resorcin, in a weight ratio ranging from 1:0.05 to 1:3.

2. The product according to claim 1, wherein the sulfonated amino resin is a sulfonate-containing melamine-formaldehyde condensate.

3. The product according to claim 1, wherein the amino group-containing substance is melamine.

4. A process for producing the product as defined in claim 1, which comprises mixing an aqueous sulfonated amino resin solution and an amino group-containing substance in a solid content weight ratio of from 1:0.05 to 1:3 and heating the resulting mixture at a temperature of from 50 to 150° C.

5. A sol comprising a liquid medium and particles of the product as defined in claim 1, having a primary particle diameter of from 1 to 100 nm, dispersed in the liquid medium.

6. A papermaking process which comprises sheeting an aqueous papermaking stock containing cellulose fibers (A), or a cellulose fibers (A) and an inorganic filler material (B), followed by removal of water and drying, wherein a cationic or amphoteric polymer (C) and a product (D) obtained by reacting a sulfonated amino resin and an amino group-containing substance in a weight ratio of from 1:0.05 to 1:3, are added to the aqueous papermaking stock before the sheeting.

7. The papermaking process according to claim 6, wherein the polymer as component (C) is a cationic or amphoteric starch, a cationic or amphoteric polyacrylamide derivative, a cationic or amphoteric guar gum, a polydimethylaminoethyl methacrylate, a polyethyleneimine, a polyamide-polyamine-epichlorohydrin resin, or a mixture thereof.

8. The papermaking process according to claim 6, wherein component (D) is a product obtained by reacting a sulfonated amino resin and an amino group-containing substance in a weight ratio of from 1:0.05 to 1:3, and it is used in the form of a sol having particles of the product having a primary particle diameter of from 1 to 100 nm dispersed in an aqueous medium.

9. The papermaking process according to claim 6, wherein the sulfonated amino resin used for the preparation of component (D) is a sulfonate-containing melamine-formaldehyde condensate.

10. The papermaking process according to claim 6, wherein the amino group-containing substance used for the preparation of component (D) is melamine.

11. The papermaking process of claim 6, wherein said amino group-containing substance is selected from the group consisting of melamine and melamine in admixture with urea, a guanamine, dicyandiamide, an amine, an acid amide, a phenol or a resorcin.

* * * * *